(12) United States Patent
Mogi (10) Patent No.: US 10,029,678 B2
(45) Date of Patent: Jul. 24, 2018

(54) DRIVE CONTROL DEVICE WITH TRACTION CONTROL FUNCTION FOR RIGHT-LEFT INDEPENDENT DRIVE VEHICLE

(71) Applicant: NTN CORPORATION, Osaka (JP)

(72) Inventor: Katsutoshi Mogi, Iwata (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 15/370,557

(22) Filed: Dec. 6, 2016

(65) Prior Publication Data
US 2017/0080926 A1 Mar. 23, 2017

Related U.S. Application Data

(63) Continuation of application No. PCT/JP2015/065874, filed on Jun. 2, 2015.

(30) Foreign Application Priority Data

Jun. 9, 2014 (JP) .................. 2014-118473

(51) Int. Cl.
*B60L 15/20* (2006.01)
*B60W 30/02* (2012.01)
(Continued)

(52) U.S. Cl.
CPC ........... *B60W 30/02* (2013.01); *B60K 7/0007* (2013.01); *B60L 15/20* (2013.01); *B60L 15/2036* (2013.01);
(Continued)

(58) Field of Classification Search
CPC . B60L 15/20; B60L 7/28; B60L 3/102; B60K 17/356; B60K 28/16; B60T 8/175
See application file for complete search history.

(56) References Cited

U.S. PATENT DOCUMENTS 5,275,474 A * 1/1994 Chin ..................... B60K 28/16
303/148
7,906,919 B2 * 3/2011 Nakamura ............. B60L 3/102
318/34
(Continued)

FOREIGN PATENT DOCUMENTS

CN 101088818 A 12/2007
CN 201712486 U 1/2011
(Continued)

OTHER PUBLICATIONS

International Preliminary Report on Patentability dated Dec. 22, 2016 in corresponding International Patent Application No. PCT/JP2015/065874.
(Continued)

*Primary Examiner* — Yuri Kan (57) ABSTRACT

Traction control unit interposed between torque allocation unit and torque control unit for left and right wheels and each configured to inhibit a slip of the drive wheel during acceleration or deceleration are provided. A longitudinal force estimation unit for estimating longitudinal forces acting on the respective left and right wheels and longitudinal force coincidence control unit are provided. The longitudinal force coincidence control unit compares absolute values of the longitudinal forces on the left and right wheels estimated by the longitudinal force estimation unit, and provides a driving torque command that generates a longitudinal force equal to the longitudinal force whose absolute value is smaller, to the torque control unit for the drive wheel at which the absolute value is larger.

5 Claims, 8 Drawing Sheets

(51) Int. Cl.
   *B60K 7/00*      (2006.01)
   *B60W 10/08*     (2006.01)

(52) U.S. Cl.
   CPC ..... *B60W 10/08* (2013.01); *B60K 2007/0092* (2013.01); *B60W 2520/266* (2013.01); *B60W 2710/083* (2013.01); *Y02T 10/7258* (2013.01)

(56) References Cited

U.S. PATENT DOCUMENTS

| | | | |
|---|---|---|---|
| 9,205,760 B2 | 12/2015 | Makino | |
| 9,333,970 B2 | 5/2016 | Kato et al. | |
| 2007/0038340 A1 | 2/2007 | Sekiguchi et al. | |
| 2008/0283348 A1* | 11/2008 | Evans | B60L 7/28 188/164 |
| 2009/0026984 A1 | 1/2009 | Nakamura et al. | |
| 2010/0245123 A1* | 9/2010 | Prasad | B60T 8/175 340/870.41 |
| 2014/0025241 A1 | 1/2014 | Andou et al. | |
| 2015/0012158 A1 | 1/2015 | Makino | |
| 2015/0112508 A1 | 4/2015 | Kato et al. | |

FOREIGN PATENT DOCUMENTS

| | | | | |
|---|---|---|---|---|
| EP | 1 916 142 A2 | | 4/2008 | |
| JP | 2007/49825 | | 2/2007 | |
| JP | 2007-209068 | | 8/2007 | |
| JP | 2007209068 A | * | 8/2007 | ............ B60L 15/20 |
| JP | 2008-109787 | | 5/2008 | |
| JP | 2008109787 A | * | 5/2008 | ............ B60K 28/16 |
| JP | 2013-243847 | | 12/2013 | |
| JP | 2013243847 A | * | 12/2013 | ............ B60L 15/20 |
| WO | 2013/114969 A1 | | 8/2013 | |
| WO | WO 2013/176081 A1 | | 11/2013 | |

OTHER PUBLICATIONS

Takashi Fujita et al., "A study of Novel Traction Control Method for Electric Propulsion Vehicle", Society of Automotive Engineers of Japan, No. 107-08, Congress Autumn Summarized Papers, 2008, pp. 11 to 16.
International Search Report dated Jul. 21, 2015 in corresponding International Application No. PCT/JP2015/065874.
Extended European Search Report dated Feb. 21, 2018 in corresponding European Patent Application No. 15806266.1. 7 pp.
Notification of Reasons for Refusal dated Mar. 6, 2018, in corresponding Japanese Patent Application No. 2014-118473, 6 pgs.
Chinese Office Action dated May 21, 2018, in corresponding Chinese Patent Application No. 201580030094.X, 7 pgs.
Japanese Notification of Refusal dated Jun. 5, 2018, in corresponding Japanese Patent Application No. 2014-118473, 6 pgs.

* cited by examiner

RELATIONSHIP BETWEEN SLIP RATIO AND LONGITUDINAL FORCE

Fig. 8

EXAMPLE OF TRACTION CONTROL

Fig. 9

YAW MOMENT GENERATED BY DIFFERENCE
BETWEEN LONGITUDINAL FORCES
ON LEFT AND RIGHT WHEELS

Fig. 10

CHANGE OF YAW ANGULAR VELOCITY
(ONLY TRACTION CONTROL)

Fig. 11

CHANGE OF YAW ANGULAR VELOCITY
(TRACTION CONTROL + LONGITUDINAL FORCE
COINCIDENCE CONTROL FOR LEFT AND RIGHT WHEELS)

Fig. 12

EXAMPLE OF TRACTION CONTROL

DRIVE CONTROL DEVICE WITH TRACTION CONTROL FUNCTION FOR RIGHT-LEFT INDEPENDENT DRIVE VEHICLE

CROSS REFERENCE TO THE RELATED APPLICATION

This application is a continuation application, under 35 U.S.C. § 111(a), of international application No. PCT/JP2015/065874, filed Jun. 2, 2015, which claims priority to Japanese patent application No. 2014-118473 filed Jun. 9, 2014, the disclosure of which are incorporated by reference in their entirety into this application.

BACKGROUND OF THE INVENTION (Field of the Invention)

The present invention relates to a drive control device with a traction control function for a right-left independent drive vehicle such as an in-wheel motor vehicle.

(Description of Related Art)

As a traction control method for a right-left independent drive vehicle, the following techniques have been proposed. In conventional art (Patent Document 1), on the basis of the motor rotation speed of one wheel of left and right wheels, a reference speed for the motor rotation speed of the other wheel which is a control target is determined. A certain allowable speed range is added to the reference speed determined thus, and the resultant range is set as a speed limit range for the motor rotation speed of the control target. Limitation is provided to a torque command value on the basis of the set speed limit range, whereby grip is maintained even on a slippery road surface to enable stable traveling.

In other conventional art (Non-Patent Document 1), a target slip ratio for each wheel of a right-left independent drive vehicle is set, and a driving torque is controlled in accordance with the difference between the target slip ratio and the actual slip ratio so as to follow the target slip ratio, thereby inhibiting a slip of each wheel.

RELATED DOCUMENT

Patent Document

[Patent Document 1] JP Laid-open Patent Publication No. 2008-109787

Non-Patent Document

[Non-Patent Document 1] Takeshi FUJITA et al., "A Study of Novel Traction Control Method for Electric Propulsion Vehicle", Society of Automotive Engineers of Japan, Congress (Autumn) Summarized Papers, No. 107-08 (2008), pp. 11-16

SUMMARY OF THE INVENTION

In the control of conventional art 1, road surface conditions such as a road surface frictional coefficient, longitudinal forces acting on wheels, the slip ratios of the wheels, and information concerning a slip of each wheel are not used. Thus, it is expected that there is a situation in which a slip of each wheel cannot be sufficiently inhibited.

Figure 7:
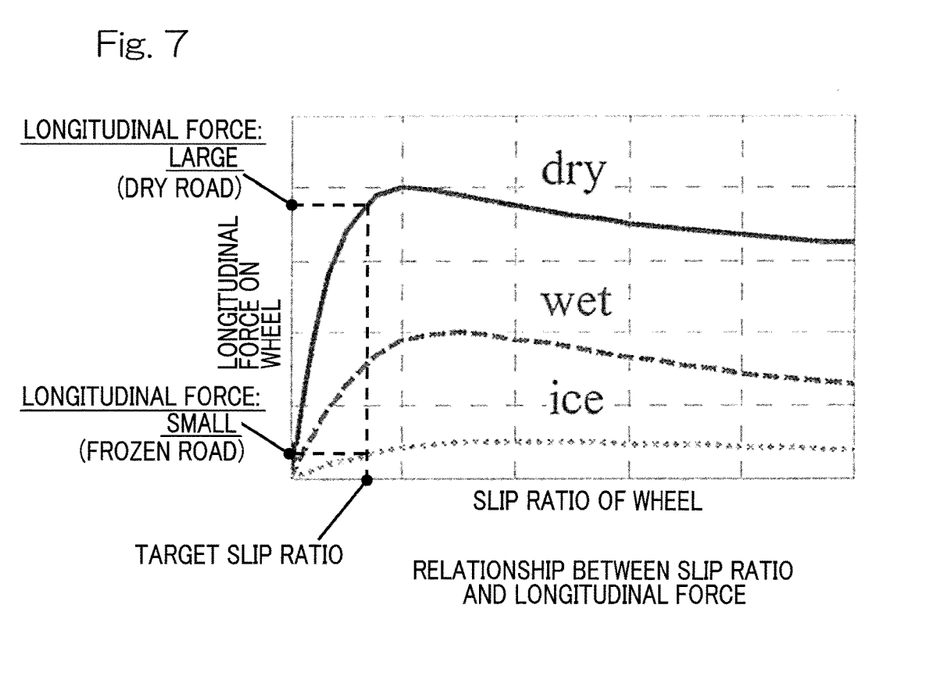
FIG. 7 is a graph showing a general relationship between a slip ratio and a longitudinal force.

In the control of conventional art 2, target slip ratios for the left and right wheels are the same. Thus, as shown in FIG. 7, a difference is produced between longitudinal forces on left and right wheels when road characteristics are different between the left and right wheels. As a result, there is a possibility that unintentional yawing motion occurs.

An object of the present invention is to provide a drive control device with a traction control function for a right-left independent drive vehicle which drive control device is able to inhibit undesired yawing motion, while preventing a slip of each wheel through traction control, even when road surface frictional coefficients are different between left and right wheels.

A drive control device with a traction control function for a right-left independent drive vehicle according to the present invention is a drive control device with a traction control function for a right-left independent drive vehicle including left and right drive wheels 3 driven independently by drive sources 4, in which the drive control device controls the drive sources 4 for the respective left and right wheels 3, the drive control device including:

a torque control unit 17 configured to control the drive sources 4 for the respective wheels 3 in accordance with torque commands T* provided from a torque allocation unit 11 to the respective left and right wheels 3;

traction control units 18 ($18_L$, $18_R$) for the left and right wheels 3 interposed between the torque allocation unit and the torque control unit 17 for the respective wheels 3 and each configured to perform traction control for inhibiting a slip of the drive wheel 3 during acceleration or deceleration and provide a driving torque T ($T_l$, $T_r$) command that is a result of the control, to the torque control unit 17;

longitudinal force estimation units 23 for the left and right wheels 3, each configured to estimate longitudinal forces $F_l$, $F_r$ acting on the respective left and right wheels 3; and a longitudinal force coincidence control unit 19 configured to compare absolute values of the longitudinal forces $F_l$, $F_r$ estimated by the longitudinal force estimation unit 23 for the left and right wheels 3, and provide, instead of a driving torque to be outputted from the traction control unit 18, a driving torque command T that generates a longitudinal force equal to the longitudinal force whose absolute value is smaller, to the torque control unit 17 for the drive wheel 3 at which the absolute value is larger.

According to this configuration, first, the longitudinal forces $F_l$, $F_r$ acting on the left and right wheels 3 are estimated during traction control for the right-left independent drive vehicle. On the basis of the estimated longitudinal forces $F_l$, $F_r$, the driving torque is controlled such that the longitudinal force whose absolute value is larger becomes equal to the longitudinal force whose absolute value is smaller. Accordingly, it is possible to eliminate the difference between the longitudinal forces on the left and right wheels 3 to prevent occurrence of undesired yaw moment.

Therefore, even when the road surface frictional coefficient are different between the left and right wheels 3, it is possible to inhibit undesired yawing motion while preventing a slip of each wheel by the traction control.

In one embodiment of the present invention, the drive sources 4 may be electric motors. When the drive sources 4 are electric motors, the traction control and the longitudinal force coincidence control can be more favorably performed, since the drive sources 4 have good responsiveness.

The traction control unit 18 may perform the traction control by any control method. However, for example, the traction control unit 18 may calculate a torque under assumption of no slip from a rotation angular velocity of the drive wheel 3, may perform feedback of a difference between the calculated torque and the driving torque via a controller 21 to thereby decrease the torque command T*, and may output a driving torque T to be actually provided to the torque control unit 17. Accordingly, the traction control can be favorably performed.

In addition, the traction control unit 18 may be configured to set a target slip ratio $\lambda^*$ for the drive wheel 3, and output a driving torque to be actually provided to the torque control unit 17, via a controller 21 from a difference between the set target slip ratio $\lambda^*$ and an actual slip ratio. Even with this configuration, the traction control can be favorably performed.

In one embodiment of the present invention, each drive source 4 may be an electric motor that is a component part of an in-wheel motor drive device 7. In the case of this configuration as well, since the drive sources 4 are electric motors and thus have good responsiveness, the traction control and the longitudinal force coincidence control can be more favorably performed.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
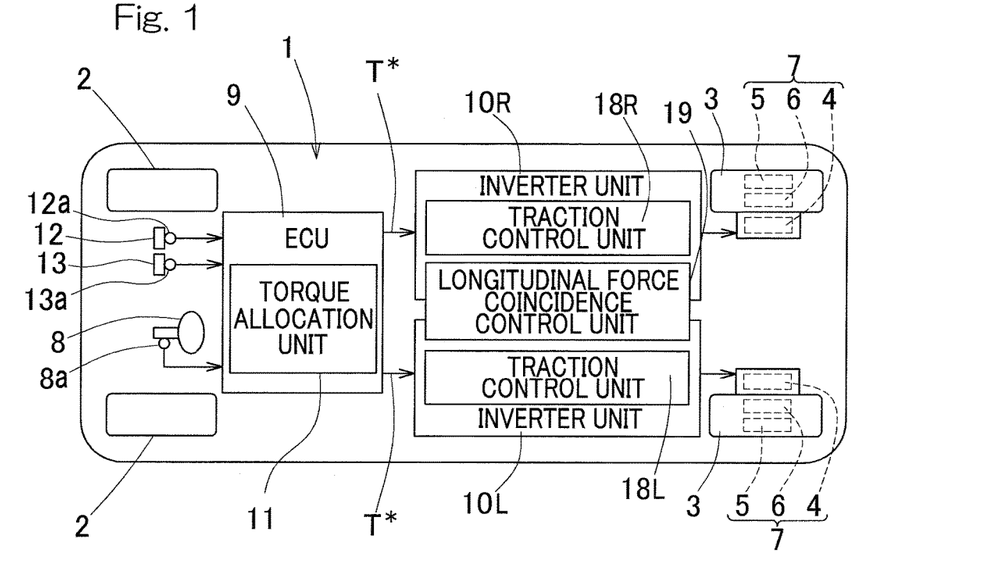
FIG. 1 is an explanatory diagram showing a conceptual configuration of a right-left independent drive vehicle to which a drive control device with a traction control function according to a first embodiment of the present invention is applied.

A first embodiment of the present invention will be described with reference to FIGS. 1 to 4. FIG. 1 shows a conceptual configuration of an electric vehicle that is a right-left independent drive vehicle to which a drive control device with a traction control function according to this embodiment is applied. The vehicle 1 is a four-wheel automobile including driven wheels 2, 2 as front wheels and drive wheels 3, 3 as rear wheels. The left and right drive wheels 3, 3, which are the rear wheels of the vehicle 1, are independently driven by motors 4, 4, respectively, which are drive sources. In this example, each motor 4, together with a wheel bearing 5 and a reduction gear 6, forms a component part of an in-wheel motor drive device 7. The reduction gear 6 reduces the speed of rotational output of the motor 4 and transmits the rotational output to a rotating ring (not shown) of the wheel bearing 5. The driven wheels 2, 2, which are the front wheels, are turning wheels, and are steered by steering operation device 8 such as a steering wheel via a turning mechanism (not shown).

A control system of the vehicle 1 includes an ECU 9 and two inverter units 10 ($10_L$, $10_R$) that drive the respective motors 4, 4. The ECU 9 and each inverter unit 10 are connected to each other so as to enable signal transmission therebetween via CAN communication or the like. In the drawings and the specification, portions for the right drive wheel 3 are sometimes assigned with a subscript R or r, and portions for the left drive wheel 3 are sometimes assigned with a subscript L or l, but these subscripts are sometimes omitted particularly when it is not necessary to distinguish between right and left.

The ECU 9 is an electronic control unit that performs general integrated control and cooperative control of the entirety of the vehicle 1. The ECU 9 is provided with a torque allocation unit 11. The torque allocation unit 11 provides a torque command T* to each of the left and right drive wheels 3, 3. Specifically, the torque allocation unit 11 receives acceleration and deceleration signals from detectors 12*a*, 13*a* that detect an operation amount of an acceleration operation device 12 such as an accelerator pedal and an operation amount of a deceleration operation device 13 such as a brake pedal, and generates the torque command T* to be outputted to the inverter unit 10. The torque allocation unit 11 may have a function to provide different torque commands T* to the left and right inverter unit $10_L$ and $10_R$, respectively, in accordance with a steering amount obtained from a steering amount detector 8*a* for the steering operation means 8. However, in the following description, the case of a straight traveling, during which the same torque commands T* are provided to both inverter units $10_L$ and $10_R$ will be described.

Figure 2:
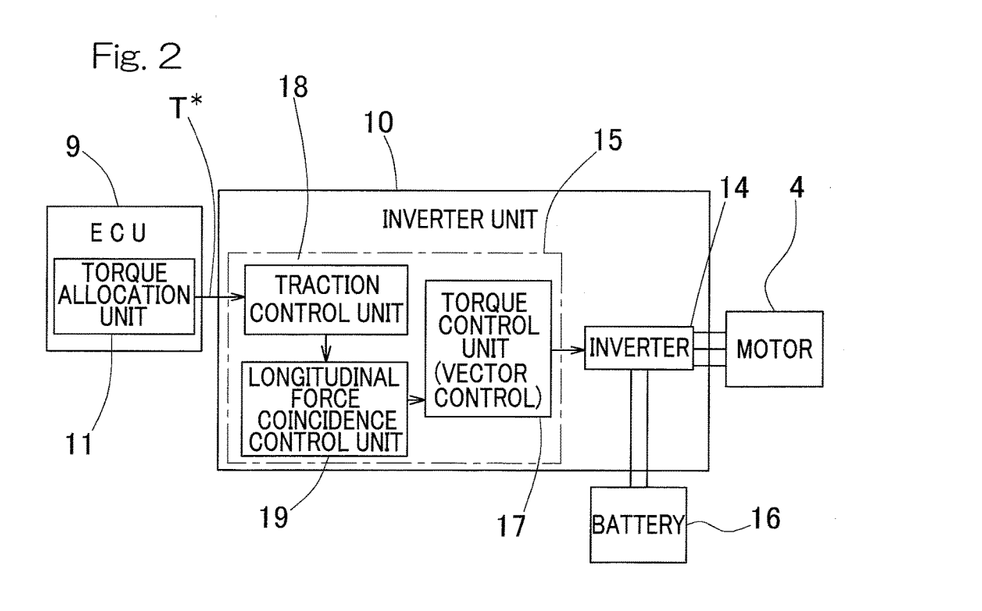
FIG. 2 is a block diagram showing a conceptual configuration of an ECU and one inverter unit of the right-left independent drive vehicle.

As shown in FIG. 2, each inverter unit 10 includes: an inverter 14 that converts DC power from a battery 16 to AC power and applies the AC power to the motor 4; and a motor control block 15. The motor control block 15 includes an electronic component such as a microcomputer. The motor control block 15 generally includes a torque control unit 17 that receives the torque command T* and provides a driving torque command to the inverter 14. The torque control unit 17 controls the motors 4, 4, which are the drive sources for the respective left and right drive wheels 3, 3, in accordance with the torque commands T* provided from the torque control unit 11 to the left and right drive wheels 3, 3. The torque control unit 17 efficiently controls the motor 4 through phase control such as vector control. The motor control block 15 of the inverter unit 10 having such a configuration is provided with a traction control unit 18 and a longitudinal force coincidence control unit 19. The traction control unit 18 is interposed between the torque allocation unit 11 and the torque control unit 17, and is provided in each of the inverter units $10_L$ and $10_R$ in the illustrated example. In the illustrated example, a single longitudinal force coincidence control unit 19 is provided partially in each of both inverter units $10_L$ and $10_R$. Alternatively, the longitudinal force coincidence control unit 19 may be provided in each of the inverter units $10_L$ and $10_R$. The traction control unit 18 and the longitudinal force coincidence control unit 19 are configured by software or the like. The traction control unit 18 and the longitudinal force coincidence control unit 19 may be provided in the ECU 9.

Figure 3:
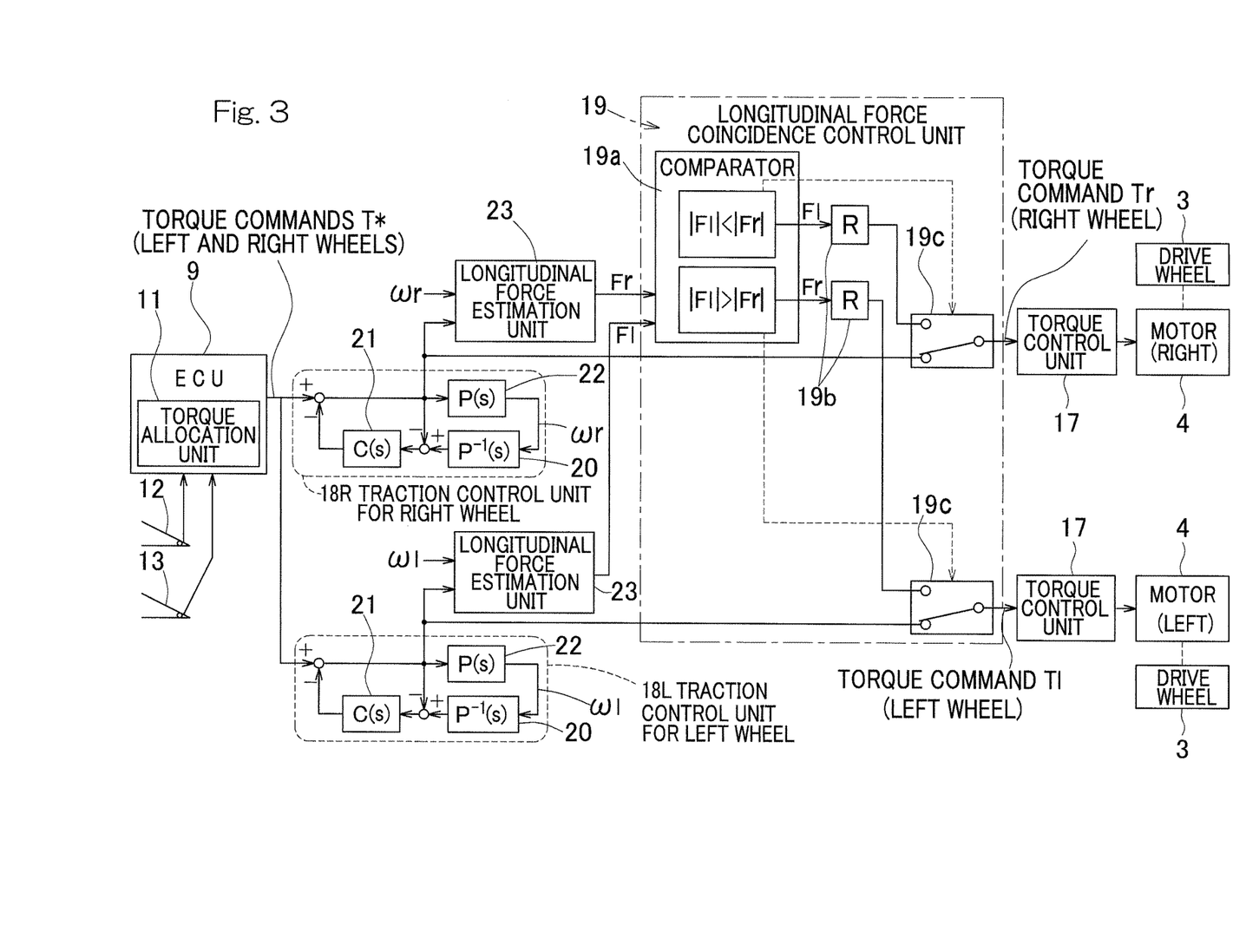
FIG. 3 is a block diagram showing a conceptual configuration of the drive control device with the traction control function.
Figure 4:
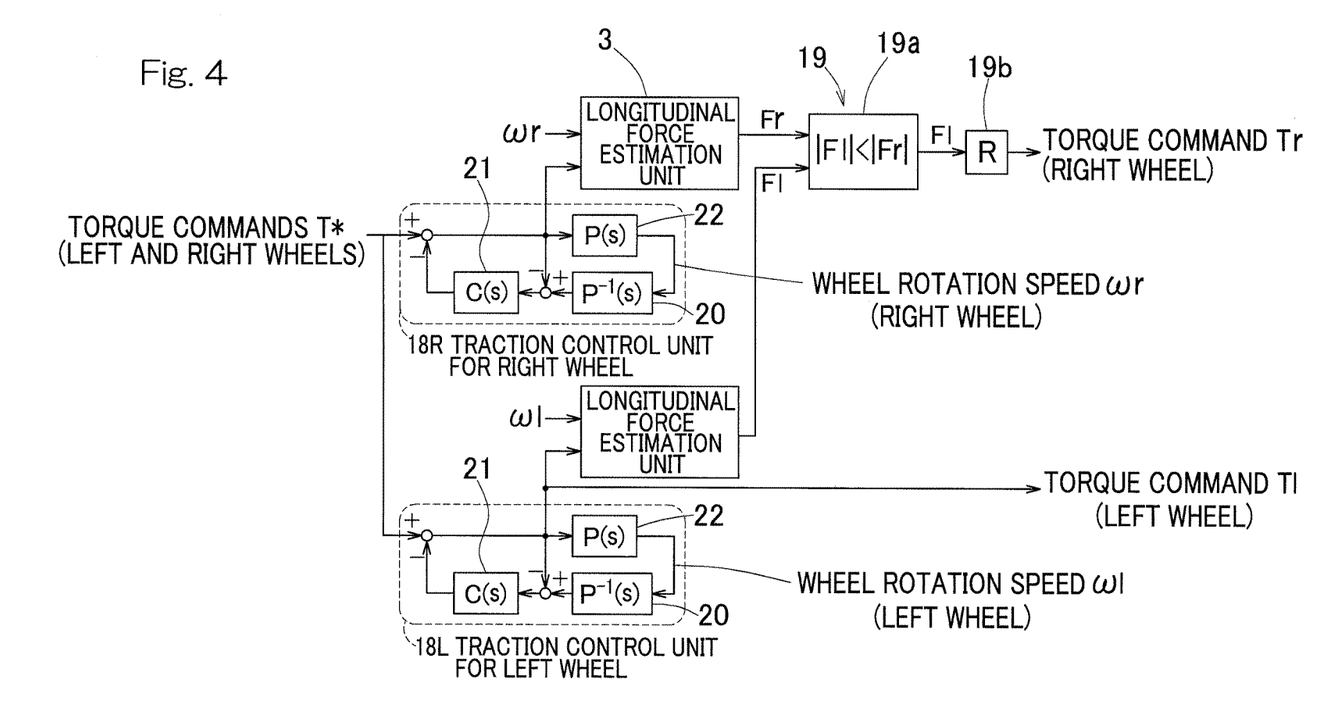
FIG. 4 is an explanatory diagram showing a state under a predetermined condition for the drive control device.

FIG. 3 shows a specific example of the traction control unit 18 ($18_L$, $18_R$) and the longitudinal force coincidence control unit 19. FIG. 4 shows a diagram obtained by extracting a part of FIG. 3, wherein blocks that do not function in the case where a longitudinal force $F_l$ on the left wheel is smaller than a longitudinal force $F_r$ on the right wheel, are omitted. In FIG. 3, the traction control unit 18 performs traction control for inhibiting a slip of the drive wheel 3 during acceleration or deceleration and provides a driving torque command that is a result of the control, to the torque control unit 17. In this example, the traction control unit 18 calculates, with an adhesion model 20, a torque under assumption of no slip, from a rotation angular velocity of the drive wheel 3, performs feedback of the difference between the calculated torque and a driving torque via a controller 21 to thereby decrease the torque command T*, and outputs a driving torque T to be actually provided to the torque control unit 17. The rotation angular velocity of the drive wheel 3 is obtained, for example, through calculation from a detection value of a rotation angle detector (not shown) provided to the wheel bearing 5 (FIG. 1) or a detection value of a rotation angle detector (not shown) provided to the motor 4.

Figure 8:
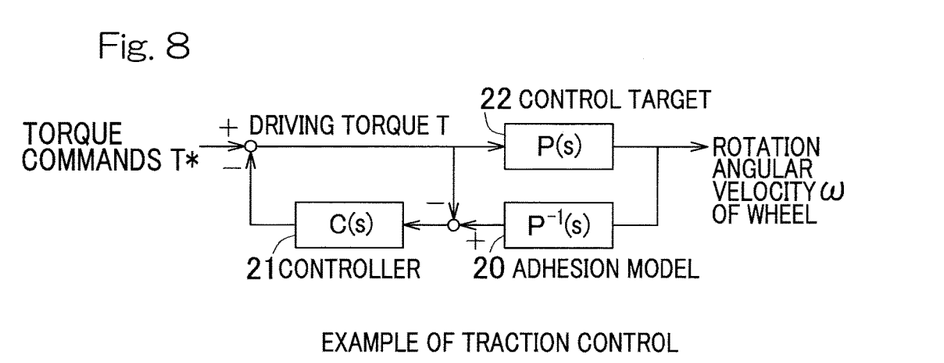
FIG. 8 is a block diagram showing a conceptual configuration of an example of a traction control device.

More specifically, as the traction control unit 18, a control unit shown in FIG. 8 is applied. The traction control unit 18 in FIG. 8 performs control with the torque command T* as an input and with the rotation angular velocity of the drive wheel 3 as an output. In the embodiment in FIG. 3, the output is a driving torque. In FIG. 3, P(s) is a vehicle characteristic model 22 representing actual vehicle characteristics. $P^{-1}(s)$ is a block called an adhesion model represented by the following formula (1), and the adhesion model 20 is a model that calculates a torque obtained when no slip is assumed, from a rotation angular velocity ω of the drive wheel 3.

$$P^{-1}(s) = \left(I + \frac{m}{n}R^2\right)s \tag{1}$$

In this formula, I represents moment of inertia of a wheel rotating portion, m represents the vehicle mass, n represents the number of drive wheels, and R represents a wheel radius. The difference between the torque calculated by the adhesion model 20 and the driving torque T is obtained, feedback of the difference is performed via the controller 21 to thereby decrease the torque command T* so as to inhibit a slip, and the driving torque T to be actually provided is obtained.

Figure 9:
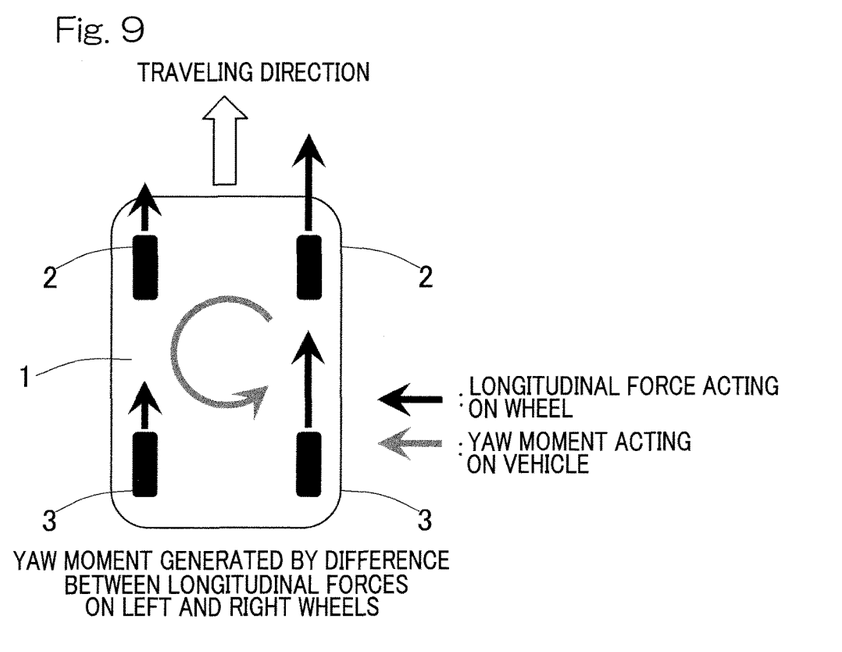
FIG. 9 is an explanatory diagram showing an occurrence of yaw moment in conventional traction control.

In the above traction control, when road surface frictional coefficients of the left and right drive wheels (hereinafter, sometimes referred to simply as "left and right wheels") 3 are equal to each other, longitudinal forces generated on the left and right wheels 3 are equal to each other, so that stable acceleration can be performed while inhibiting a slip of each drive wheel 3. However, when the road surface frictional coefficients of the left and right wheels 3 are different from each other, the effect of slip inhibition is present, but as shown in FIG. 9, a difference occurs between the longitudinal forces on the left and right wheels 3 and thus yaw moment occurs in the vehicle, so that there is a possibility of hampering stable traveling.

Therefore, as shown in FIG. 3, control in which the longitudinal forces on the left and right wheels 3 are rendered to be equal to each other is added to the traction control by the longitudinal force coincidence control unit 19. In addition, a longitudinal force estimation unit 23 that estimate longitudinal forces acting on the left and right wheels 3, respectively, in order that the longitudinal forces are used in the control in which the longitudinal forces on the left and right wheels 3 are rendered to be equal to each other are provided. The respective longitudinal force estimation units 23 estimate longitudinal forces on the left and right wheels 3 during the traction control by using the following formulas (2) and (3) based on an equation of motion of each wheel.

$$F_l = \frac{1}{R}\left(T_l - I\frac{d\omega_l}{dt}\right) \tag{2}$$

$$F_r = \frac{1}{R}\left(T_r - I\frac{d\omega_r}{dt}\right) \tag{3}$$

In the formulas (2) and (3), a subscript "l" represents the left wheel, and a subscript "r" represents the right wheel. With the motor drive vehicle, it is easy to recognize the driving torques, and thus longitudinal forces can be estimated by the above formulas. Each driving torque is calculated, for example, from a detection value of a current sensor (not shown) that detects a value of current flowing through the motor 4. The current value and the driving torque have a certain relationship. Other than the above calculation based on the equation of motion, the longitudinal force estimation unit 23 may be configured to, for example, obtain loads in a predetermined direction acting on wheel support means such as the wheel bearings 5 (FIG. 1) supporting the drive wheels 3, from detection values of distortion detection sensors (not shown) and detect longitudinal forces.

The longitudinal force coincidence control unit 19 compares the longitudinal forces $F_l$ and $F_r$ on the left and right wheels 3 estimated by the longitudinal force estimation unit 23 as described above, and adjusts a driving torque to be provided to the wheel 3 at which the absolute value of the longitudinal force is larger, such that the longitudinal force whose absolute value is larger is rendered to be equal to the longitudinal force whose absolute value is smaller. That is, in addition to the traction control, the driving torque for the wheel 3 at which the absolute value of the longitudinal force is larger is provided on the basis of the following formulas (4) and (5).

$$T_l = RF_r \text{(when } |F_l| > |F_r|) \tag{4}$$

$$T_r = RF_l \text{(when } |F_l| < |F_r|) \tag{5}$$

FIG. 4 shows the case where the absolute value of the longitudinal force $F_l$ on the left wheel is smaller than the absolute value of the longitudinal force $F_r$ on the right wheel as described above. In this case, for the left wheel, a driving torque $T_l$ outputted from the traction control unit $18_L$ is used for motor drive, while for the right wheel, a driving torque obtained by multiplying, by the wheel radius R, the longitudinal force $F_l$ on the left wheel calculated by the longitudinal force coincidence control unit 19 is used for motor drive.

In FIG. 3, the longitudinal force coincidence control unit 19 includes: a comparator 19a that compares the absolute values; a torque calculator 19b that multiplies the longitudinal force whose absolute value is smaller, by the wheel radius R to calculate the driving torque T; and a switching section 19c that switches between providing the driving torque T outputted from the traction control unit 18 to the torque control unit 17 and providing the torque T calculated by the torque calculator 19b to the torque control unit 17, in accordance with a result of the comparison by the comparator 19a.

By performing the operation based on the formulas (4) and (5) in addition to the traction control, it is possible to not only prevent a slip of each wheel and but also eliminate the difference between the longitudinal forces on the left and right wheels to prevent occurrence of undesired yaw moment.

Figure 10:
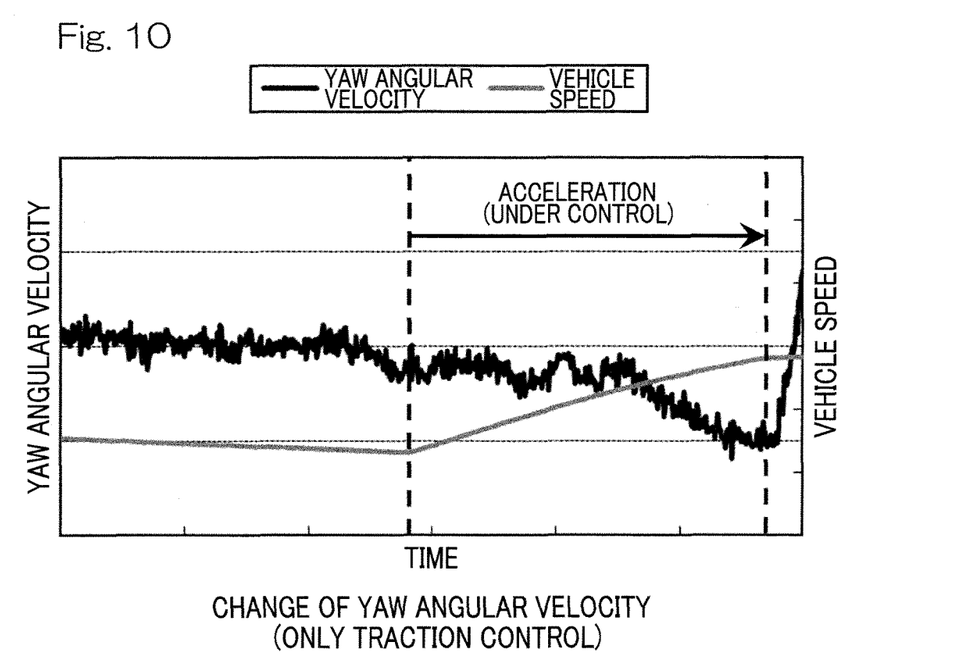
FIG. 10 is a graph showing change of a yaw angular velocity in the case where only traction control is performed.
Figure 11:
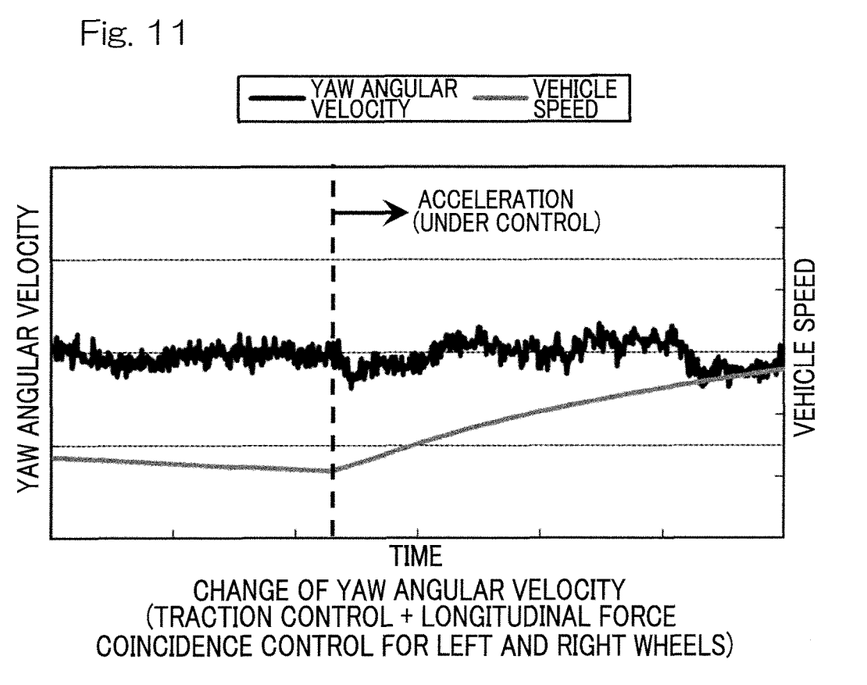
FIG. 11 is a graph showing change of a yaw angular velocity in the case where longitudinal force coincidence control for left and right wheels is added to traction control.

FIG. 10 shows a yaw angular velocity of the vehicle in the case where only the traction control shown in FIG. 8 is applied and a traveling test with straight traveling and acceleration is carried out. In addition, FIG. 11 shows a yaw angular velocity of the vehicle in the case where longitudinal force coincidence control by the operation based on the formulas (4) and (5) is added to the traction control as shown in FIG. 3 and the same test is carried out. The maximum road surface frictional coefficient is 0.2 for the left wheel and 0.05 for the right wheel, that is, different between left and right. As shown in FIG. 8, only with the traction control, a yaw angular velocity occurs during acceleration, and a turning motion occurs against the driver's intention of traveling straight. On the other hand, by adding the operation based on the formulas (4) and (5) to the traction control, the longitudinal forces on the left and right wheels 3 becomes equal to each other, so that substantially no yaw angular velocity occurs as shown in FIG. 11 and acceleration is enabled with straight traveling.

In FIGS. 10 and 11, the traction control starts at a time shown by a vertical broken line in the drawings. In addition, the reason why the yaw angular velocity rapidly returns at the right edge of FIG. 10 is that the acceleration is stopped and the application of the traction control is cancelled.

Figure 5:
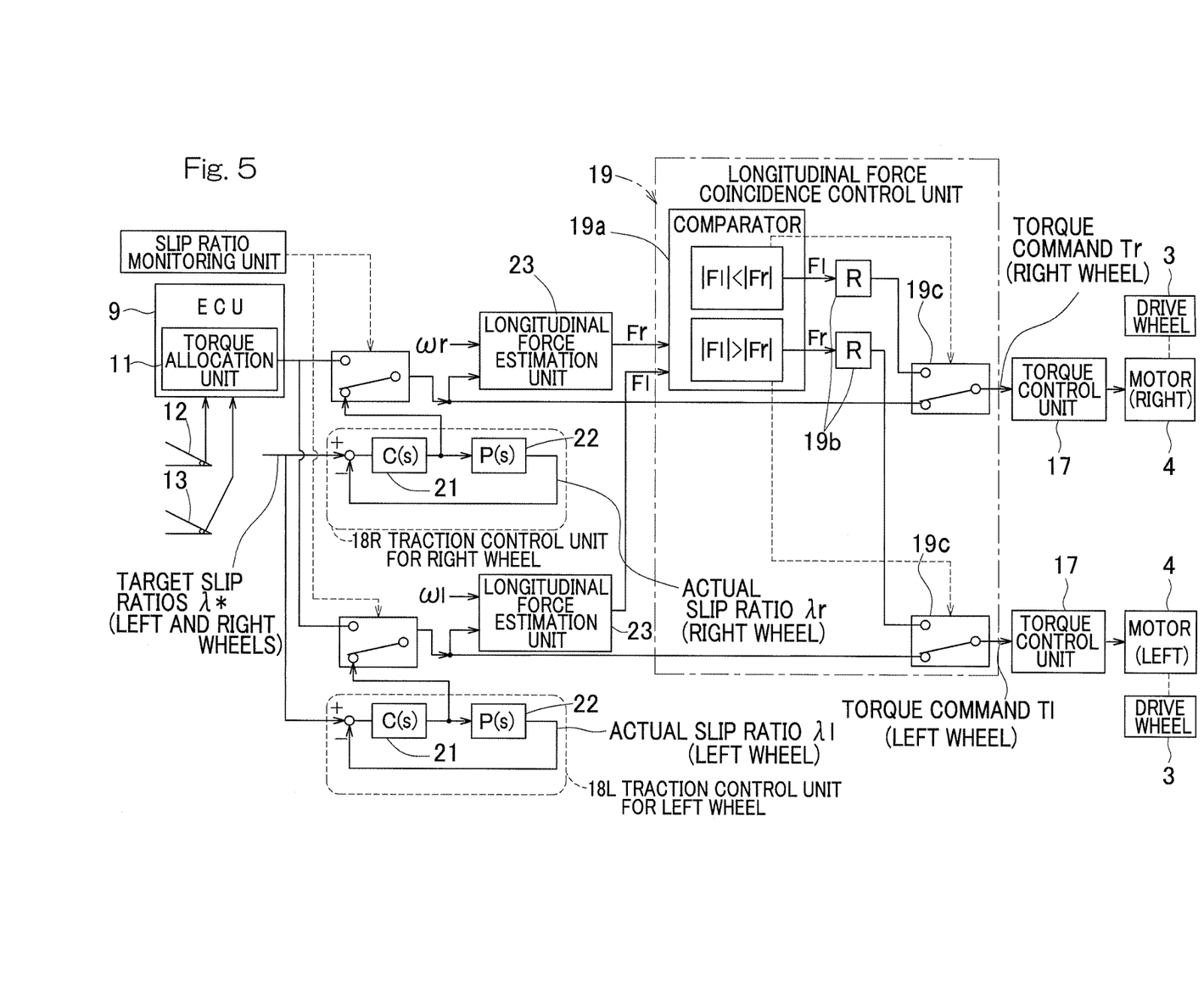
FIG. 5 is a block diagram showing a conceptual configuration of a drive control device with a traction control function for a right-left independent drive vehicle according to another embodiment.
Figure 6:
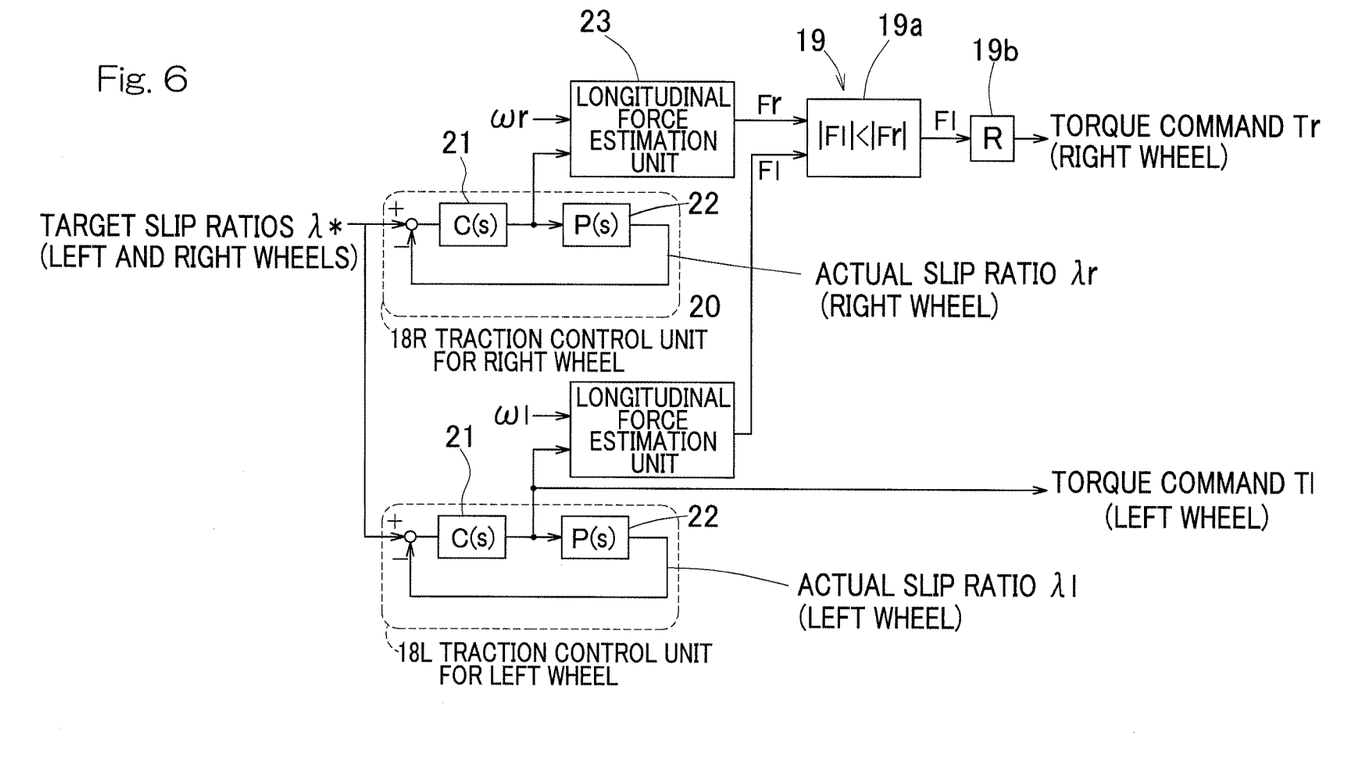
FIG. 6 is an explanatory diagram showing a state under a predetermined condition for the drive control device.

The configuration of the traction control unit 18 is not limited to the configuration shown in FIGS. 3 and 4, and may be a configuration shown in FIGS. 5 and 6. The example in FIGS. 5 and 6 is the same as the first embodiment described with reference to FIGS. 1 to 4, except for matters described in particular. FIG. 6 shows a diagram obtained by extracting a part of FIG. 5, wherein blocks that do not function in the case where the longitudinal force F1 on the left wheel is smaller than the longitudinal force $F_r$ on the right wheel. In the example in FIGS. 5 and 6, the traction control unit 18 sets a target slip ratio $\lambda^*$ for each drive wheel, and outputs a driving torque to be actually provided to the torque control unit 17, via the controller 21 from the difference between the set slip ratio $\lambda$ and the actual slip ratio. In this control, the slip ratio $\lambda$ is defined by the following formula (6).

$$\lambda = \frac{R\omega - V}{R\omega} \tag{6}$$

In the formula (6), $R\omega$ represents a wheel speed, and V represents a vehicle speed. The block diagram shown in FIG. 5 in this embodiment shows a configuration in which the longitudinal force coincidence control unit 19 that performs the operation based on the formulas (4) and (5) is added to traction control shown in FIG. 12. It should be noted that the output of the traction control unit 18 is a driving torque.

Figure 12:
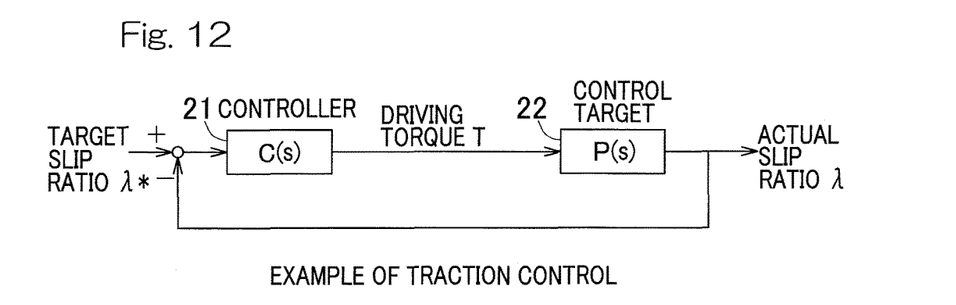
FIG. 12 is a block diagram showing another example of the traction control device.

More specifically, in FIG. 12, the "slip ratio $\lambda^*$" is set as an input value to the traction control unit 18. In addition, a slip ratio monitoring unit 25 is provided independently of the traction control unit 18. The slip ratio monitoring unit 25 always calculates the actual slip ratio $\lambda$, and changes a torque calculation method on the basis of the calculation result as follows.

(1) When $\lambda > \lambda^*$, a torque is calculated by using the traction control unit 18 as in FIGS. 5 and 6, regardless of the output (torque) of the torque allocation unit 11.

(2) When $\lambda \leq \lambda^*$, the traction control unit 18 in FIGS. 5 and 6 is not used, and the output (torque) of the torque allocation unit 11 is directly inputted to the switching section 19c.

The "slip ratio $\lambda^*$" is a target value, is set to such a value ($\lambda^*$=about 0.1 to 0.2) that the longitudinal force is approximately a maximum value in a curve shown in FIG. 7 for any road surface, and is used for control. That is, with reference to FIG. 7, the change of the torque calculation method described in the above (1) and (2) has the following effects.

(1) In a region where the longitudinal force decreases or almost does not change ($\lambda > \lambda^*$), a slip is inhibited by the traction control, and a longitudinal force that is approximately the maximum value that can be taken for the road surface is provided.

(2) In a region where the longitudinal force increases ($\lambda \leq \lambda^*$), the traction control is not performed, so that the driver enables normal traveling corresponding to a pedal operation.

In the case of this configuration as well, by performing the operation based on the formulas (4) and (5) in addition to the traction control, it is possible to not only prevent a slip of each wheel 3 and but also eliminate the difference between the longitudinal forces on the left and right wheels 3 to prevent occurrence of undesired yaw moment.

The present invention is applicable to the case of deceleration with the motors 4, in addition to the time of vehicle acceleration. However, in the case where the traction control using the slip ratio shown in FIG. 12 is performed during deceleration, the slip ratio is defined by the following formula (7), not by the above formula (6).

$$\lambda = \frac{V - R\omega}{V} \tag{7}$$

The case of straight traveling has been described above, but the longitudinal force coincidence control unit 19 may be configured, for example, to obtain a steering amount from the steering amount detector 8a for the steering operation means 8 and to include a unit (not shown) that is executed only when the steering amount falls within an allowable range in which the traveling can be regarded as straight traveling. In addition, the case where the right-left independent drive vehicle is an in-wheel motor vehicle has been described in the above embodiment, but the present invention is effectively applicable to an electric vehicle that is a right-left independent drive vehicle in which motors that drive left and right drive wheels, respectively, are mounted on a chassis (not shown). Moreover, the present invention is not limited to the case where the traveling drive sources are motors, and is also applicable to a right-left independent drive vehicle including an internal combustion engine as a traveling drive source. Furthermore, the present invention is applicable to a four-wheel drive vehicle. In this case, the control by the longitudinal force coincidence control unit 19 is applied to two front wheels, and is applied to two rear wheels.

REFERENCE NUMERALS

3 . . . Drive wheel
4 . . . Motor (Drive source)
5 . . . Wheel bearing
6 . . . Reducer
7 . . . In-wheel motor drive device
9 . . . ECU
10, $10_L$, $10_R$ . . . Inverter unit
11 . . . Torque allocation unit
17 . . . Torque control unit
18 . . . Traction control unit
19 . . . Longitudinal force coincidence control unit
20 . . . Adhesion model
21 . . . Controller
22 . . . Vehicle characteristic model
23 . . . Longitudinal force estimation unit

What is claimed is:

1. A drive control device with a traction control function for a right-left independent drive vehicle, the right-left independent drive vehicle including a left drive wheel driven by a drive source for the left drive wheel, a right drive wheel driven by a drive source for the right drive wheel, an electronic control unit (ECU) that performs general integrated control and cooperative control of the right-left independent drive vehicle, the ECU having a torque allocation unit configured to provide torque commands for each of the left drive wheel and the right drive wheel, the drive control device comprising:

a torque control unit configured to control the drive source for the left drive wheel in accordance with the torque commands provided from the torque allocation unit;
a torque control unit configured to control the drive source for the right drive wheel in accordance with the torque commands provided from the torque allocation unit;
a traction control unit for the left drive wheel configured to perform traction control for inhibiting a slip of the left drive wheel during acceleration or deceleration and to provide a driving torque command that is a result of the control, to the torque control unit configured to control the drive source for the left drive wheel,
a traction control unit for the right drive wheel configured to perform traction control for inhibiting a slip of the right drive wheel during acceleration or deceleration and to provide a driving torque command that is a result of the control, to the torque control unit configured to control the drive source for the right drive wheel;
a longitudinal force estimation unit for the left drive wheel configured to estimate longitudinal forces acting on the left drive wheel;
a longitudinal force estimation unit for the right drive wheel configured to estimate longitudinal forces acting on the right drive wheel; and
a longitudinal force coincidence control unit configured to compare absolute values of the longitudinal forces estimated by the longitudinal force estimation unit for the left drive wheel and the longitudinal force estimation unit for the right drive wheel, and to provide a driving torque command that generates a longitudinal force equal to the longitudinal force whose absolute value is smaller, to the one of the torque control units for the left drive wheel and right drive wheel at which the absolute value is larger,
wherein the driving torque command provided by the longitudinal force coincidence control unit replaces the driving torque command from the traction unit.

2. The drive control device with the traction control function for the right-left independent drive vehicle as claimed in claim 1, wherein the drive source for the left drive wheel is an electric motor for the left drive wheel, and
the drive source for the right drive wheel is an electric motor for the right drive wheel.

3. The drive control device with the traction control function for the right-left independent drive vehicle as claimed in claim 1, wherein the traction control unit for the left drive wheel is configured to calculate a torque under an assumption of no slip from a rotation angular velocity of the left drive wheel, to perform feedback of a difference between the calculated torque and the driving torque to thereby decrease the torque command, and output a driving torque to be actually provided to the torque control unit configured to control the drive source for the left drive wheel, and
the traction control unit for the right drive wheel is configured to calculate a torque under an assumption of no slip from a rotation angular velocity of the right drive wheel, to perform feedback of a difference between the calculated torque and the driving torque to thereby decrease the torque command, and output a driving torque to be actually provided to the torque control unit configured to control the drive source for the right drive wheel.

4. The drive control device with the traction control function for the right-left independent drive vehicle as claimed in claim 1, wherein the traction control unit for the left drive wheel is configured to set a target slip ratio for the left drive wheel, to thereby output a driving torque to be actually provided to the torque control unit configured to control the drive source for the left drive wheel from a difference between the set target slip ratio and an actual slip ratio, and
the traction control unit for the right drive wheel is configured to set a target slip ratio for the right drive wheel, to thereby output a driving torque to be actually provided to the torque control unit configured to control the drive source for the right drive wheel from a difference between the set target slip ratio and an actual slip ratio.

5. The drive control device with the traction control function for the right-left independent drive vehicle as claimed in claim 1, wherein the drive source for the left drive wheel is an electric motor that is a component part of an in-wheel motor drive device for the left drive wheel, and
the drive source for the right drive wheel is an electric motor that is a component part of an in-wheel motor drive device for the right drive wheel.

* * * * *

UNITED STATES PATENT AND TRADEMARK OFFICE
CERTIFICATE OF CORRECTION

| | |
|---|---|
| PATENT NO. | : 10,029,678 B2 |
| APPLICATION NO. | : 15/370557 |
| DATED | : July 24, 2018 |
| INVENTOR(S) | : Katsutoshi Mogi |

Page 1 of 1

It is certified that error appears in the above-identified patent and that said Letters Patent is hereby corrected as shown below:

In the Claims

Column 9, Line 58:
In Claim 1, delete "wheel," and insert -- wheel; --, therefore.

Signed and Sealed this
Sixth Day of November, 2018

Andrei Iancu
*Director of the United States Patent and Trademark Office*